United States Patent [19]

Danielson et al.

[11]  4,379,851

[45]  Apr. 12, 1983

[54] TINTED BOROSILICATE GLASSES

[75] Inventors: Paul S. Danielson, Corning; Ronald P. Mattison, Big Flats; Albert J. Werner, Horseheads, all of N.Y.

[73] Assignee: Corning Glass Works, Corning, N.Y.

[21] Appl. No.: 393,059

[22] Filed: Jun. 28, 1982

[51] Int. Cl.³ ............................................. C03C 3/08
[52] U.S. Cl. .................................................. 501/66
[58] Field of Search ......................................... 501/66

[56] References Cited

U.S. PATENT DOCUMENTS 2,662,020  12/1953  Schofield et al. ..................... 501/66
3,495,964  2/1970   Hares et al. .......................... 501/66
3,953,646  4/1976   Fletcher ............................... 501/66
4,116,704  9/1978   Boyd et al. ........................... 501/66

FOREIGN PATENT DOCUMENTS 49-126712  12/1974  Japan ..................................... 501/66
727585     4/1980   U.S.S.R. ............................... 501/66

*Primary Examiner*—Mark Bell
*Attorney, Agent, or Firm*—Clinton S. Janes, Jr.

[57] ABSTRACT

This invention is directed to the preparation of transparent glasses displaying a light gray-brown tint that consist essentially, in weight percent on the oxide basis, of $SiO_2$—80–82
$B_2O_3$—11.25–12
$Na_2O$—5.25–6
$Al_2O_3$—1.9–2.1
$MnO_2$—0.05–0.5
$NiO$—0.01–0.07
$Cr_2O_3$—0.005–0.03

2 Claims, 1 Drawing Figure

FOR C.I.E. ILLUMINANT C

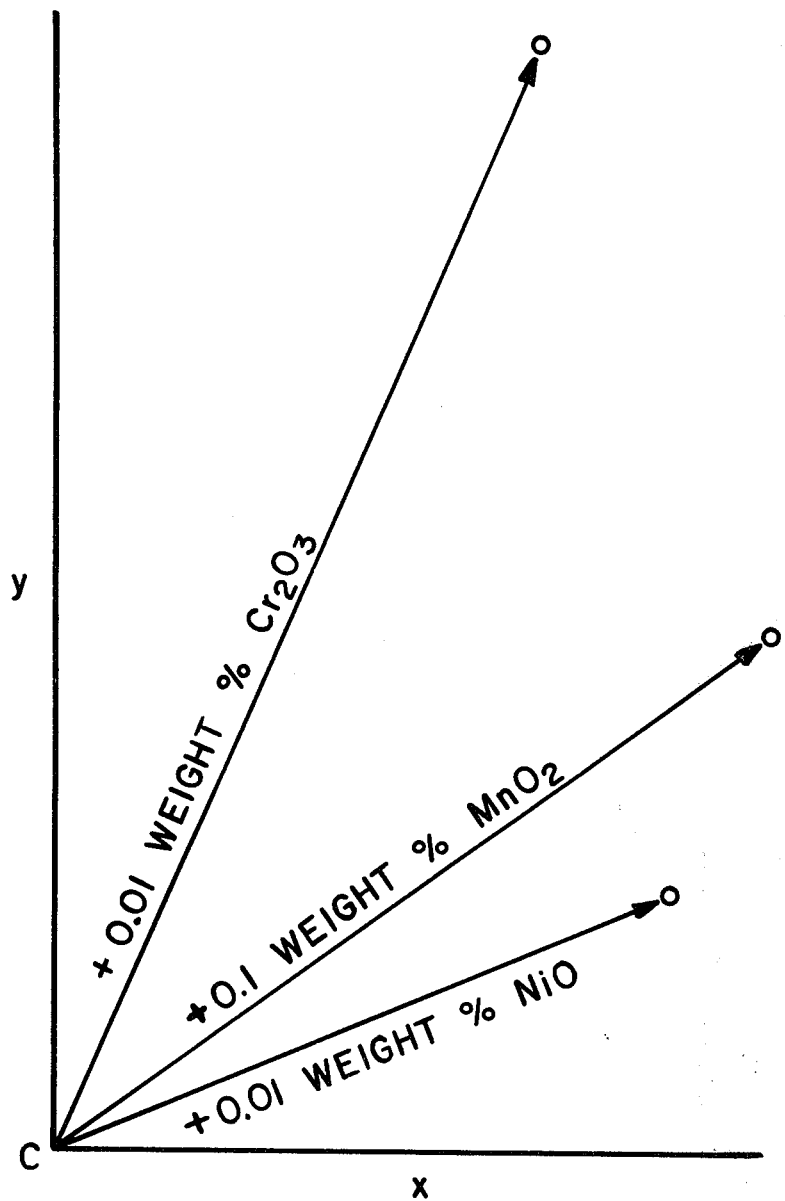
FOR C.I.E. ILLUMINANT C

TINTED BOROSILICATE GLASSES

BACKGROUND OF THE INVENTION

U.S. Pat. No. 4,116,704 disclosed the production of transparent glass articles exhibiting a critically-defined, light gray-brown tint having compositions within a specifically-delineated area within the sodium aluminoborosilicate system containing narrowly-restricted amounts of $Co_3O_4$, NiO, and $MnO_2$ to impart the desired gray-brown tint thereto. Thus, the patented glasses followed a particular transmittance curve in the visible portion of the radiation spectrum and consisted essentially, expressed in terms of parts by weight on the oxide basis, of about:

$SiO_2$—78.0–80.0
$B_2O_3$—14.16–12.35
$Na_2O$—5.15–4.7
$Al_2O_3$—2.21–2.0
$Co_3O_4$—0.001–0.006
NiO—0.037–0.055
$MnO_2$—0.21–0.6

Customarily, those glasses will be chloride fined via the addition of up to about 1% NaCl.

The mechanism by which the $Ni^{+2}$ ion imparts color to a glass depends upon whether it is present in a four-fold or six-fold coordination, as is explained in U.S. Pat. No. 4,116,704, and that discussion is explicitly incorporated herein by reference. In brief, when in the four-fold coordination, $Ni^{+2}$ ions confer a purple coloration to the glass, and, when in the six-fold coordination, $Ni^{+2}$ ions provide a yellow tint to the glass. Thermal treatment of the glass influences the coordination state adopted by the $Ni^{+2}$ ions; e.g., conventional annealing of the glass results in the $Ni^{+2}$ ions being in the six-fold coordination, thereby promoting a yellow coloration in the glass. In contrast, quick cooling of the glass, as occurs in thermal tempering, leaves the $Ni^{+2}$ ion in the four-fold coordination. And because borosilicate glasses utilized in culinary ware are customarily thermally tempered to enhance mechanical strength and thermal shock resistance, this capability of $Ni^{+2}$ ions to assume six-fold or tetrahedral coordination is of vital practical significance to the glass manufacturer.

Because the cost of boron-containing glass batch ingredients and, particularly, boric acid has escalated rapidly in recent years, there has been the desire to reduce the overall amount of $B_2O_3$ in the glass and/or modify the glass composition such that a less expensive raw material, e.g., borax, could be substituted for boric acid. The base glass compositions of U.S. Pat. No. 4,116,704 were modified so as to reduce the $B_2O_3$ content while retaining comparable chemical and physical properties. However, in doing so, two important differences were soon observed existing between the glasses of U.S. Pat. No. 4,116,704 and those newly-devised.

First, the changes in composition altered the "molecular" structure of the glass. Thus, the ratio on a molar basis (moles of substance) of $Na_2O:B_2O_3$ has been regarded as an important parameter in the chemical and physical behavior of borosilicate glasses. See "Borate Glasses—Structure, Preparation, and applications", L. D. Pye, V. D. Frechette, and N. J. Kreidl, Plenum Press, New York, 1978. The molar ratio $Na_2O:B_2O_3$ of the compositions of U.S. Pat. No. 4,116,704 are generally less than 0.47. In contrast, the molar ratio $Na_2O:B_2O_3$ of the inventive glasses will customarily be at least 0.5. And, as is explained in that patent, structural changes occurring in glass strongly influence the colors obtained from the inclusion therein of various transition metal ions, especially $Ni^{+2}$ ions.

The second major difference existing between the glasses of U.S. Pat. No. 4,116,704 and those recently prepared lies in the level of NaCl required to effect fining of the glass. Hence, the patent prescribes the incorporation of up to about 1% NaCl. In contrast, the newly-devised glasses employ no more than about 0.5% NaCl with typical contents ranging between about 0.2–0.4%. This reduction in NaCl level in the batch also results in changes in the colors displayed by various transition metal oxide colorants.

Consequently, for those two reasons the combination of NiO, $MnO_2$ and $Co_3O_4$ utilized in U.S. Pat. No. 4,116,704 to secure the desired light gray-brown hue in the recited base $Na_2O$-$Al_2O_3$-$B_2O_3$-$SiO_2$ glasses imparts colors which are too dark, i.e., having a lower $Y_c$ value using the C.I.E. notation, and too purple, thereby indicating a higher proportion of tetrahedrally coordinated $Ni^{+2}$ ion being present. Stated in a different manner, it is not possible to match the chromaticity and luminous transmittance targets of the glasses of U.S. Pat. No. 4,116,704 utilizing any combination of NiO, $MnO_2$, and $Co_3O_4$ with the lower $B_2O_3$ base glasses.

BRIEF DESCRIPTION OF THE DRAWING

FIG. 1 depicts color vectors for $Ni^{+2}$ ions, $Mn^{+3}$ ions and $Cr^{+3}$ ions plotted in the x, y chromaticity diagram utilizing C. I. E. Illuminant C.

SUMMARY OF THE INVENTION

This invention provides transparent glasses which closely approximate the chromaticity targets of the U.S. Pat. No. 4,116,704, but wherein the $B_2O_3$ content of the base glass is lower. Thus, the inventive base glasses consist essentially, expressed in terms of weight percent on the oxide basis, of $Na_2O$—5.25–6
$Al_2O_3$—1.9–2.1
$B_2O_3$—11.25–12
$SiO_2$—80–82 and utilize as tinting agents, also in weight percent, to confer a light gray-brown hue NiO—0.01–0.07
$MnO_2$—0.05–0.5
$Cr_2O_3$—0.005–0.03

Each of those transition metal oxides is critical to achieve the desired hue in the glass. $Ni^{+2}$ ions provide the color vector delineated in FIG. 1. $Mn^{+3}$ ions are required for two reasons: first, they add a purple-brown color similar to that of $Ni^{+2}$ ions (FIG. 1), but without causing undesirable darkening of the glass, i.e., they do not effect a lowered luminous transmittance; and, second, $Mn^{+3}$ ions impart a unique pinkish aspect to the color which is not seen with $Ni^{+2}$ alone. Nevertheless, the combination of $Ni^{+2}$ and $Mn^{+3}$ ions alone yields a tint which is still too purple. $Cr^{+3}$ ions act to neutralize a portion of the purple hue via the addition of a small amount of a green component. The net effect of this ternary colorant system is to achieve chromaticity (x, y) and luminous transmittance (Y) values which closely match those of the U.S. Pat. No. 4,116,704 glasses. Accordingly, in the inventive glasses x will range between about 0.3440–0.3500, y will range between about 0.3400–0.3525, and Y between about 37–52. In accordance with conventional glass analysis practice, nickel is expressed in terms of NiO, manganese in terms of $MnO_2$, and chromium in terms of $Cr_2O_3$. Finally, the molar ratio $Na_2O:B_2O_3$ will generally be at least 0.5.

DESCRIPTION OF PREFERRED EMBODIMENTS

The table below records glasses, expressed in terms of parts by weight on the oxide basis, demonstrating the compositional parameters of the invention. Inasmuch as the sum of the individual components totals approximately 100, for all practical purposes the values reported may be deemed to reflect weight percent. The actual batch ingredients may comprise any materials, either the oxides or other compounds, which, when melted together, will be converted into the desired oxide in the proper proportion. In the tabulated examples, borax was utilized to supply $B_2O_3$ and $Na_2O$ values. NaCl comprised the fining agent. Whereas the subsequent description involved laboratory scale melting only, it will be appreciated that the following compositions would also be operable in large scale commercial melting units.

Batches for the illustrative examples were compounded, the ingredients ballmilled together to aid in securing a homogenous melt, and the mixtures then deposited into platinum crucibles. The iron reported in the following exemplary compositions was due to impurities in the batch materials. None was purposefully added and the amount present was too small to disturb the coloring tint. After covering, the crucibles were introduced into a furnace operating at about 1550° C. and the batches melted for about four hours. Thereafter, the melts were poured into steel molds to produce slabs having dimensions of about 6"×6"×0.5" and the slabs were immediately transferred to an annealer operating at about 565° C. Plates having dimensions of about 2"×2"×6 mm were cut from the slabs, the top and bottom faces thereof ground and polished, and the plates then subjected to a conventional thermal tempering process using air as the chilling medium.

Chromaticity values were measured on the polished plates utilizing a Hunter Laboratory D25PH Colorimeter and a General Electric Recording Spectrophotometer No. 732983. Coordinates were calculated for illumination with C.I.E. Illuminant C. The values for x, y, and Y determined on each glass are reported in the table below. Finally, the molar ratio $Na_2O:B_2O_3$ for each glass is tabulated.

TABLE

|  | 1 | 2 | 3 | 4 | 5 | 6 |
|---|---|---|---|---|---|---|
| $SiO_2$ | 81.0 | 81.0 | 81.0 | 81.0 | 81.0 | 81.0 |
| $B_2O_3$ | 11.9 | 11.6 | 11.6 | 11.6 | 11.6 | 11.6 |
| $Na_2O$ | 5.6 | 5.4 | 5.4 | 5.4 | 5.4 | 5.4 |
| $Al_2O_3$ | 2.0 | 2.0 | 2.0 | 2.0 | 2.0 | 2.0 |
| $MnO_2$ | 0.3 | — | 0.4 | — | 0.5 | 0.5 |
| NiO | 0.04 | 0.08 | — | 0.07 | 0.04 | 0.04 |
| $Cr_2O_3$ | 0.0175 | 0.01 | 0.02 | 0.02 | 0.0075 | 0.0175 |
| $Fe_2O_3$ | 0.02 | — | — | — | — | — |
| $Na_2O:B_2O_3$ | 0.52 | 0.52 | 0.52 | 0.52 | 0.52 | 0.52 |
| x | 0.3461 | 0.3463 | 0.3488 | 0.3462 | 0.3518 | 0.3482 |
| y | 0.3455 | 0.3352 | 0.3446 | 0.3474 | 0.3417 | 0.3495 |
| Y | 44.8 | 33.4 | 48.7 | 35.3 | 45.2 | 47.4 |
|  | 7 | 8 | 9 | 10 | 11 | 12 |
| $SiO_2$ | 81.0 | 81.0 | 81.0 | 81.0 | 81.0 | 81.0 |
| $B_2O_3$ | 11.6 | 11.6 | 11.6 | 11.6 | 11.6 | 11.6 |
| $Na_2O$ | 5.4 | 5.4 | 5.4 | 5.4 | 5.4 | 5.4 |
| $Al_2O_3$ | 2.0 | 2.0 | 2.0 | 2.0 | 2.0 | 2.0 |
| $MnO_2$ | 0.4 | 0.5 | — | — | 0.6 | 0.3 |
| NiO | 0.04 | 0.04 | 0.08 | 0.08 | — | 0.02 |
| $Cr_2O_3$ | 0.0175 | 0.0125 | 0.01 | 0.02 | 0.01 | 0.02 |
| $Na_2O:B_2O_3$ | 0.52 | 0.52 | 0.52 | 0.52 | 0.52 | 0.52 |
| x | 0.3498 | 0.3456 | 0.3449 | 0.3476 | 0.3568 | 0.3467 |
| y | 0.3479 | 0.3447 | 0.3325 | 0.3415 | 0.3408 | 0.3480 |
| Y | 44.3 | 49.5 | 31.8 | 30.9 | 46.2 | 46.2 |
|  | 13 | 14 | 15 | 16 | 17 | 18 |
| $SiO_2$ | 81.0 | 81.0 | 81.0 | 81.0 | 81.0 | 81.0 |
| $B_2O_3$ | 11.6 | 11.6 | 10.6 | 12.6 | 10.6 | 11.6 |
| $Na_2O$ | 5.4 | 5.4 | 4.9 | 4.9 | 5.9 | 5.4 |
| $Al_2O_3$ | 2.0 | 2.0 | 1.5 | 1.5 | 1.5 | 2.0 |
| $MnO_2$ | 0.2 | 0.1 | — | — | — | — |
| NiO | 0.04 | 0.06 | 0.08 | 0.08 | 0.08 | 0.08 |
| $Cr_2O_3$ | 0.02 | 0.02 | — | — | — | — |
| $Na_2O:B_2O_3$ | 0.52 | 0.52 | 0.53 | 0.42 | 0.73 | 0.52 |
| x | 0.3479 | 0.3485 | 0.3386 | 0.3531 | 0.3196 | 0.3414 |
| y | 0.3505 | 0.3504 | 0.3184 | 0.3404 | 0.2913 | 0.3229 |
| Y | 40.8 | 37.1 | 31.8 | 39.7 | 27.0 | 33.8 |

An examination of the chromaticity and luminous transmittance measurements vis-a-vis the compositions of Examples 1–18 unequivocally illustrates the criticality of composition control. Hence, Examples 1, 3, 5–8, and 12–14 conform to the required, x, y, and Y values, whereas Examples 2, 4, 9–11, and 15–18, although having closely similar compositions, do not. Example 1 is the most preferred composition.

To demonstrate that the inventive glasses exhibit chromaticity and luminous transmittance values closely approximating those displayed by the glasses of U.S. Pat. No. 4,116,704, the measurements of Example 8 of that patent, stated to be the most preferred composition, are recorded below:

x—0.3471
y—0.3459
Y—50.6

I claim:

1. A transparent glass which, after thermal tempering, exhibits a light gray-brown color and demonstrates such chromaticity (x, y) and luminous transmittance (Y) values that x ranges between about 0.3440–0.3500, y ranges between about 0.3400–0.3525, and Y ranges between about 37–52, consists essentially, expressed in terms of weight percent on the oxide basis, of $SiO_2$—80–82
$B_2O_3$—11.25–12
$Na_2O$—5.25–6
$Al_2O_3$—1.9–2.1
$MnO_2$—0.05–0.5
NiO—0.01–0.07
$Cr_2O_3$—0.005–0.03.

2. A transparent glass according to claim 1 consisting essentially, expressed in terms of parts by weight on the oxide basis, of $SiO_2$—81.0
$B_2O_3$—11.9
$Na_2O$—5.6
$Al_2O_3$—2.0
$MnO_2$—0.3
NiO—0.04
$Cr_2O_3$—0.0175
$Fe_2O_3$—0.02.

* * * * *